United States Patent [19]

Messervey et al.

[11] 4,219,532
[45] Aug. 26, 1980

[54] FOAMING DEVICE

[75] Inventors: Clifford H. Messervey, East Randolph; Peter R. Martin, Frewsburg, both of N.Y.

[73] Assignee: Borden, Inc., Columbus, Ohio

[21] Appl. No.: 949,685

[22] Filed: Oct. 10, 1978

[51] Int. Cl.² .............................. B01F 3/12; B01J 8/00
[52] U.S. Cl. ..................................... 422/133; 137/889; 137/625.48; 239/427.5; 252/359 E; 261/DIG. 26; 366/150
[58] Field of Search ........... 261/DIG. 26; 252/359 E; 422/133; 137/604, 625.4, 625.48; 239/427.5

[56] References Cited
U.S. PATENT DOCUMENTS

| 3,828,821 | 8/1974 | Dotter ........................... 137/625.4 X |
| 3,893,481 | 7/1975 | Watts ............................ 137/625.4 X |
| 3,913,892 | 10/1975 | Ersfeld et al. ..................... 422/133 |
| 4,135,882 | 1/1979 | Harkness et al. ............ 261/DIG. 26 |

Primary Examiner—Michael S. Marcus
Attorney, Agent, or Firm—George P. Maskas; Daniel D. Mast

[57] ABSTRACT

A foaming device including a housing with a cylindrical passage therethrough and four housing ports which provide communication between exterior and interior of the housing, the housing ports being connected to sources of fluids; a cylindrical spool slidably disposed within the housing provided with an axial passage therethrough and three spool ports in communication with the spool passage; the spool being displaceable to on, off and cleaning positions in a way that one has to go through the cleaning position when displacing the spool from the on to off position or vice versa.

6 Claims, 10 Drawing Figures

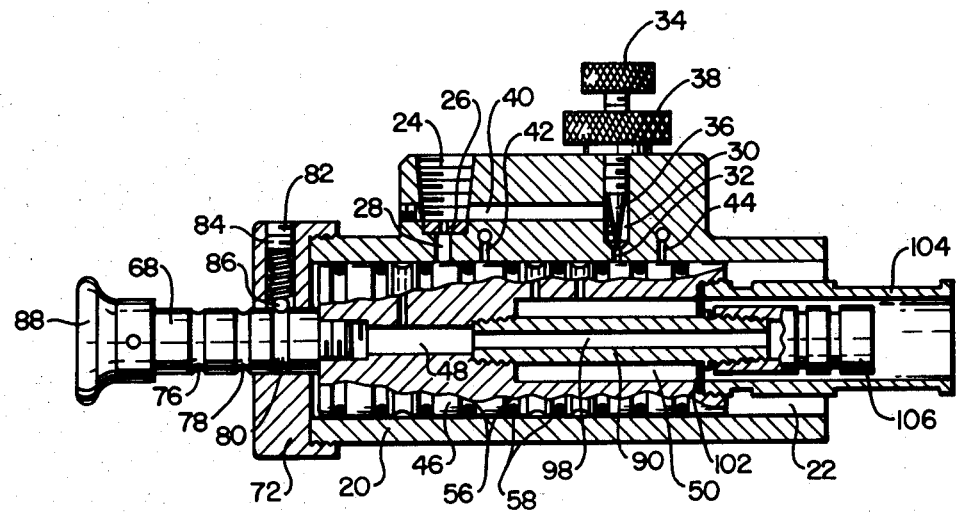
FIG. 3
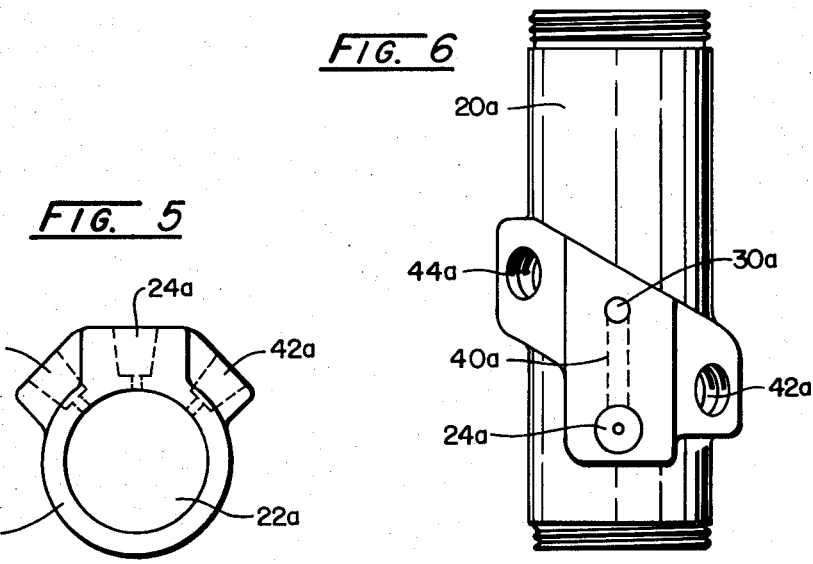
FIG. 5
FIG. 6

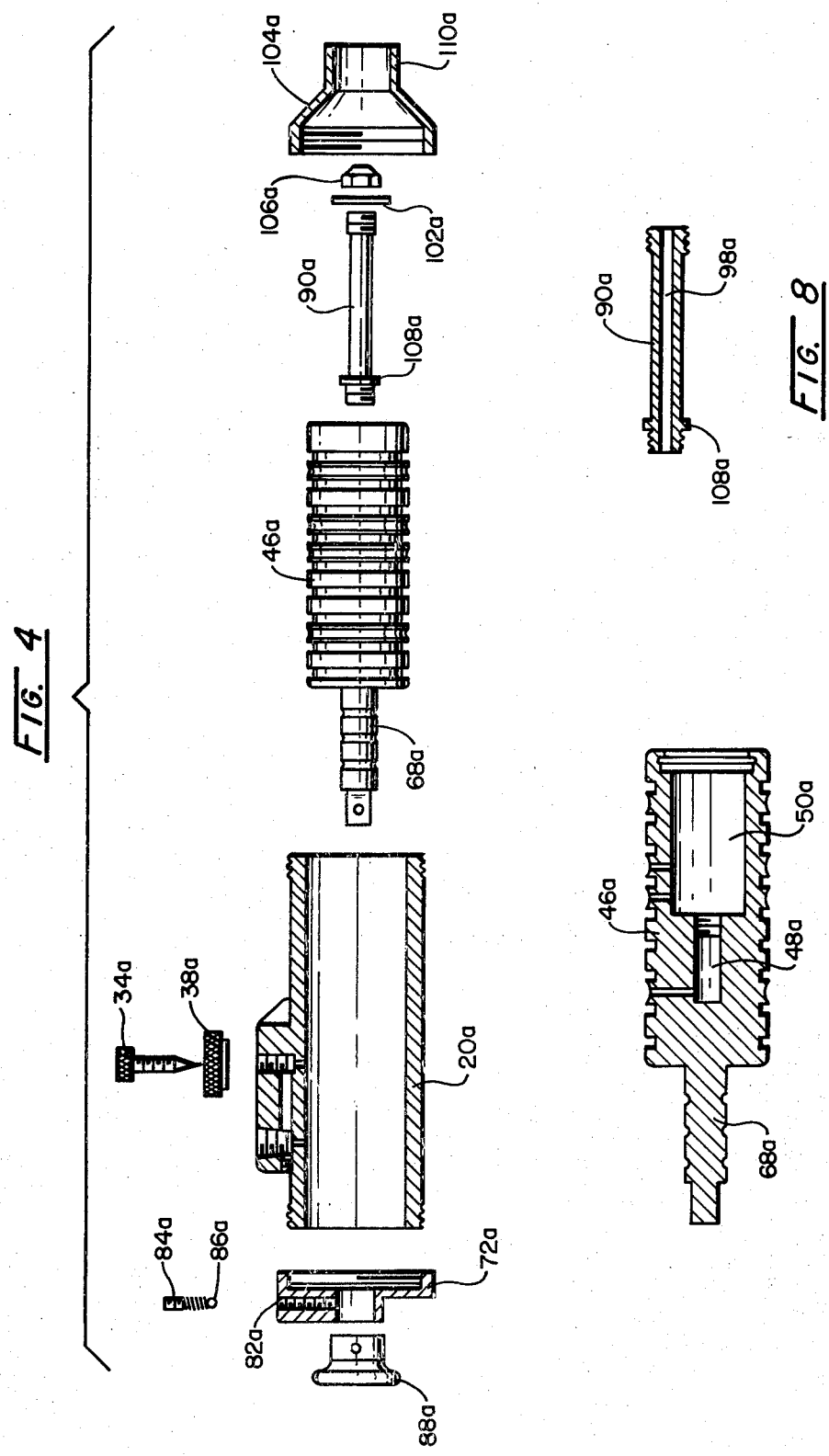

FOAMING DEVICE

This invention relates to a device for making and dispensing foam, especially insulating foam which is prepared by mixing with air a foaming agent and a resin. Although this device is described in connection with a three component foam system, it should be apparent that a two component system or a system with more than three components can be similarly made and dispensed by providing additional ports and passages without departing from the concept of this invention. Furthermore, this device can serve merely to mix two or more components whether the resulting product is a foam or something else, such as a solution or a dispersion.

With the advent of the oil embargo and the ensuing energy crisis, great emphasis has been placed on improving insulation of new structures and to enhancing insulation of existing structures. Foamed insulation is being used in new construction, however, foamed insulation has found a unique application in existing structures especially in walls and other inaccessible places where it is injected by drilling an opening in a cavity and filling it with foam. Insulation of existing structures has gained impetus with the energy crisis and appears to be gaining momentum as people become more concerned with the cost of heating and air conditioning.

The various features of the foaming device will become apparent from the following detailed description set forth in connection with the accompanying drawings which relate to the preferred embodiment of the foaming device where:

FIG. 3 is the same view of the foaming device in its off condition;

FIG. 4 is an assembly view of a second embodiment of the foaming device with parts arranged longitudinally, with some parts being in section;

FIG. 5 is an end view of the casing or housing of the foaming device showing relative disposition of the ports;

FIG. 6 is a top view of the casing showing relative disposition of the several ports which serve to introduce foam components into the foaming device;

FIG. 7 is a cross-sectional view of the spool which, in assembled condition, is disposed within the casing; and FIG. 8 is a cross-sectional view of the resin tube;

Figure 1:
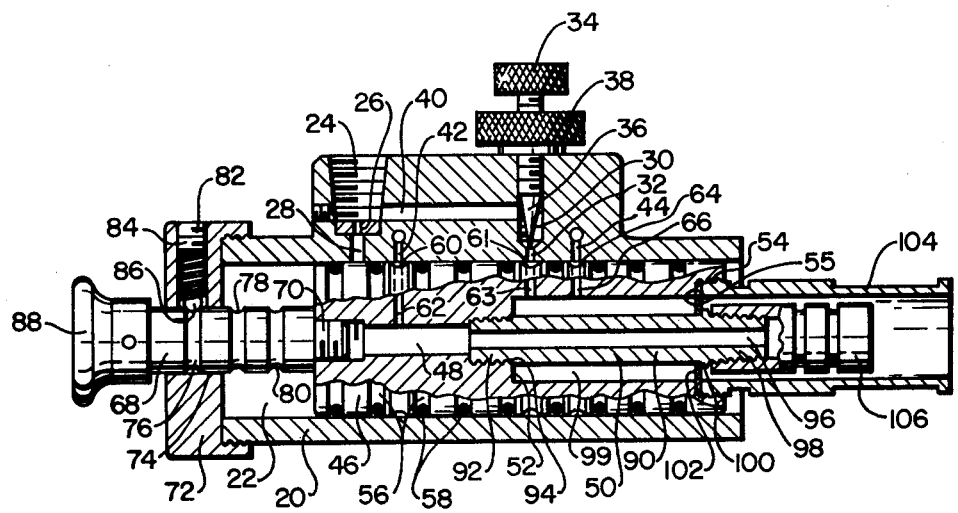
FIG. 1 is a side view of the foaming device, partly in section, which is shown in its operating condition.

The foaming device described and illustrated herein includes open-ended housing 20 with cylindrical passage 22 therethrough. Internally threaded bore 24 extends partly into housing 20 and calibrated opening 26 provides communication between bore 24 and housing blow-out air port 28 which is open to the passage 22. Another internally threaded bore 30 disposed to the right of bore 24, as viewed in FIG. 1, also extends partly into housing 20 with housing air port 32 providing communication between bore 30 and housing passage 22. Needle valve 34 with a conical tip 36 screws into bore 30. Amount of air passing into passage 22 through bore 30 and port 32 is regulated by needle valve 34 which can be screwed in or out to bring tip 36 against port 32 or some distance away from it to allow a regulatd volume of air to pass. Lock nut 38 is threaded internally to accommodate threaded stem of needle valve 34. Longitudinal fluid passage 40 in the wall of housing 20 connects bores 24 and 30 to convey pressurized air from bore 24 to bore 30 and into passage 22 through port 32. Between air ports 28 and 32 is housing resin port 42 which opens into passage 22 and is connected with an external supply of resin. Downstream or to the right of port 32, as viewed in FIG. 1, is housing foam agent port 44 which supplies a foam agent from an external source into passage 22.

Disposed within housing 20 is a spool 46 having elongated cylindrical configuration. Spool 46 has an upstream passage 48 passing axially through the spool and a downstream longitudinal axial passage 50. Spool passages 48 and 50 are connected to one another at shoulder 52 with passage 48 extending from the upstream end of spool 46 to about the mid point thereof whereas passage 50 extends from about the middle of spool 46 to a short distance from the downstream end thereof. Upstream passage 48 is internally threaded at both ends and is of a smaller diameter than the downstream passage 50. At the downstream end of spool 46, there is provided an internally threaded bore 54 along the axis of the spool which is of a larger diameter than downstream passage 50. Bore 54 forms shoulder 55 with downstream spool passage 50. A plurality of spaced circumferential grooves 56 are provided along the outer surface of the spool which are generally equidistant from each other, in a preferred embodiment. O-rings 58 are disposed in grooves 56 to provide fluid sealing between the spool and its housing. Circumferential spool resin port 60, in the form of a groove running around the spool, is provided at the upstream portion of the spool and a plurality of radial spool resin channels 62 connect the upstream passage 48 with the circumferential spool resin port 60. In the preferred embodiment, there are about 3 or 4 radial passages which are arranged symmetrically around the circumference of the spool. Circumferential spool foam agent port 64 is disposed downstream of the circumferential spool resin port 60 and is also in the foam of a groove around the spool. Radial spool form agent channels 66 connect foam agent port 64 with downstream passage 50. Between ports 60 and 64 is a circumferential spool air port 61 and a plurality of radial air channels 63 which connect port 61 with the downstream spool passage 50.

Spool 46 is slidably fitted into housing 20 and its movement within the housing is controlled by rod 68 having a threaded portion 70 of a lesser diameter at the downstream end thereof which is screwed into the upstream spool passage 48. Closure 72 is threadably secured to the upstream end of the housing and accommodates rod 68 which passes through opening 74 in closure 72. The rod has three spaced circumferential grooves 76, 78, 80 on its surface and location of these on the rod are coordinated with the location of the housing and spool ports so that proper mating is achieved for specific functions of the foaming device. Threaded bore 82 in closure 72 accommodates a spring loaded threaded screw 84 with a detent 86 which yields to allow for movement of rod 68 in and out. Knob 88 is suitably securd to rod 68 to provide gripping means to pull or push the rod to any desired position. When that position is reached, detent 86 will snap into one of the three grooves 76, 78, 80 and will securely maintain the housing and the spool in relative disposition.

As apparent from FIG. 1, the upstream end of spool passage 48 is hermetically sealed by rod 68 whereas at the opposite end of passage 48, resin tube 90 is screwed with its threaded portion 92 into the threaded portion of passage 48. Extent of threaded portion 92 of resin tube 90 is defined by shoulder 94 which, in assembled condition of the foaming device, abuts shoulder 52 of the spool. Resin tube 90 is elongated, is axially disposed in the spool and has an open-ended axial passage 96 extending from one end to the other end of the tube. At the downstream extremity of the resin tube, there is an cylindrical section 98 which is externally threaded. Shoulder 100 separates cylindrical section 98 from the rest of the resin tube. Diametrical extent of the resin tube is considerably smaller than that of spool passage 50 with the result that circumferential chamber 99 is created between resin tube 90 and the walls of passage 50.

Screen 102 is disposed between shoulder 100 of the resin tube and shoulder 55 of the spool within the downstream portion of the spool. Screen 102 is circular with a central opening which makes it possible to mount it snugly on the resin tube. Pressing screen 102 against shoulder 55 is spool extension 104 which is threadably engaged with the internally threaded portion 54 of the spool. Spool extension 104 provides attachment at its downstream end to a conduit for either dispensing foam or for water which may be used to clean the foaming device by attachment of a garden hose to the spool extension and running water through the foaming device. Resin spray nozzle 106 is threadably attached to the threaded section of resin tube 90. As shown in the drawings, spray nozzle 106 extends within the spool at its upstream portion and extends beyond the downstream end portion of the spool although within spool extension 104.

FIG. 1 depicts the foaming device in its operating condition wherein detent 86 is disposed in the first groove 76 of rod 68. Air is supplied into bore 24 under pressure of about 80 psi. In this condition, it is shown that the housing blow-out air port 28 is blocked by the spool but air from bore 24 is conveyed via housing passage 40 and bore 30 to housing air port 32 and then into spool passage 50 via circumferential spool air port 61 and radial air channels 63. At the same time, resin is introduced into housing resin port 42 and into spool passage 48 via circumferential spool resin port 60 and radial resin channels 62. Foam agent is pumped into spool passage 50 by way of housing foam agent port 44, circumferential spool foam agent port 64 and radial foam agent channels 66.

As air and foam agent are introduced into spool passage 50, mixing takes place in chamber 99 resulting in foaming of the foam agent. Screen 102, which can be a #100 mesh stainless steel screen, provides some back pressure thus enhancing foaming upstream and also serves to promote mixing as the air and foam agent are forced therethrough as well as to retain any sediment which may be entrained in the air-foam agent mixture. As it passes through screen 102, the air-foam agent mixture is being formed into foam which is conveyed into the space between spool extension 104 and spray nozzle 106. Adjusting needle valve 34 will produce foam of desired density. Meanwhile, resin is forced through spool passage 48, then through resin tube 90 and finally through spray nozzle 106 which sprays a hollow cone pattern. As the foaming air-foam agent mixture is conveyed into the spool extension, it is sprayed with the resin to provide good intermixing between the foam and the mixture which results in a final foam product with excellent characteristics. It should be noted that each housing port is sealed on both sides by O-rings to prevent seepage of air, resin and foam agent.

Figure 2:
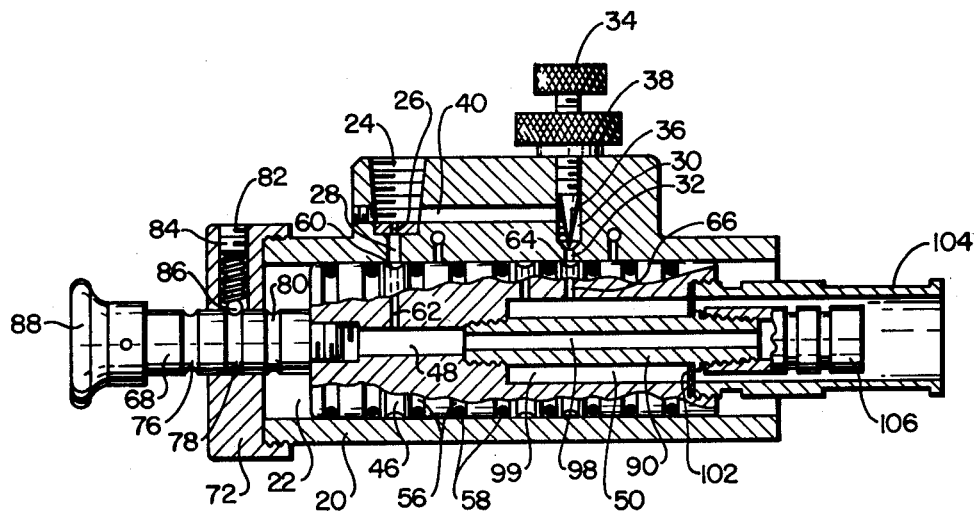
FIG. 2 is also a side view, partly in section, of the foaming device shown in its cleaning condition.

FIG. 2 illustrates air cleaning position in which the resin and foam agent housing ports 42, 44 are blocked by moving rod 88 to a position at which detent is disposed in the second groove 78. In this position, the spool blocks housing ports 42, 44. Housing blow-out air port 28 and housing air port 32 are aligned with circumferential spool ports 60, 64 and radial channels 62, 66 to introduce air into passages 48 and 50. In this fashion, air sweeps anything that may remain in passages 48, 50 as well as passage 96 of resin tube 90 and spray nozzle 106. In the cleaning position, it is also possible to clean the foaming device by attaching a garden hose to the spool extension 104 and running water therethrough to flush out any remaining debris.

When detent 86 is moved into the third groove 80, all housing ports are blocks so that the foaming device is in an off position, as shown in FIGS. 1–3, and nothing is introduced into the spool.

Looking at the arrangement of grooves 76, 78, 80 which designate on, air clean and off positions respectively, it should be apparent that this arrangement has definite advantages over others. This particular arrangement requires the operator to go through the air clean position when going from either on to off positions or from off to on positions. This is built into the foaming device and operator does not have to be instructed to go through an air cleaning routine, as is done with at least some of the prior art foaming devices. The foaming device can also be cleaned with water or another fluid at attaching a garden hose to the spool extension and placing the foaming device in the on or air clean positions whereby water would be forced through the various ports. As should be apparent to anyone familiar with this device, the air, resin and foam agent lines must be disconnected when cleaning the device with water. A better way to clean the foaming device is to disconnect the foam agent and resin lines and with the use of two connections at the end of a garden hose, connect these to the foam agent and resin ports and let water run through the foaming device.

In the embodiment shown in FIGS. 4 to 8, the foaming device is illustrated in its disassembled condition with a number of components shown in different views, some in cross-section. In this embodiment, the parts of the foaming device are essentially the same as those of the first embodiment with a number of differences. Rod 68a is integral with spool 46a, which eliminates a loose part and makes it so much simpler to assemble or disassemble the foaming device. Resin tube 90a has shoulder 108a which abuts against a cooperating shoulder when the resin tube is screwed into spool 46a. Shoulder 108a also serves as an abutment for screen 102a. Spray nozzle 106A is different from spray nozzle 106 but provides a similar spray pattern. It should be noted that the downstream external end portion of housing 20a is threaded to accommodate internal threaded section of spool extension 104a which has on its downside end external threaded section 110a for connecting ordinary garden hose when water cleaning of the foaming device is desired.

FIG. 6 is the top view of housing 20a illustrating the relative disposition of housing bores 24a and 30a for air, housing passage 40a for air and housing parts 42a and 44a for resin and foam agent, respectively. FIG. 5 is an end view of the housing and additionally illustrates certain features of the device.

Figure 9:
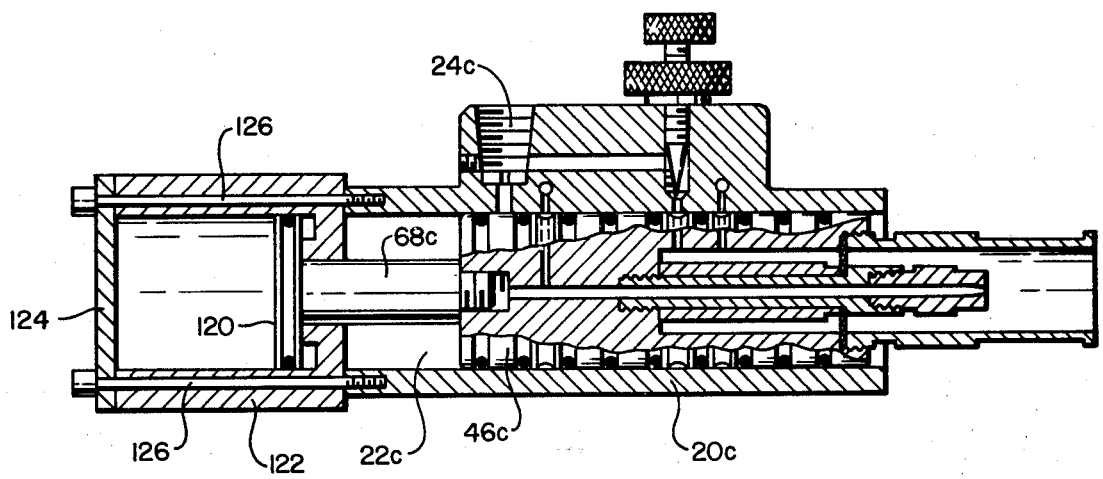
FIG. 9 is a cross-sectional view of a third embodiment wherein adjustment of the spool to the various positions is effected with air pressure.
Figure 10:
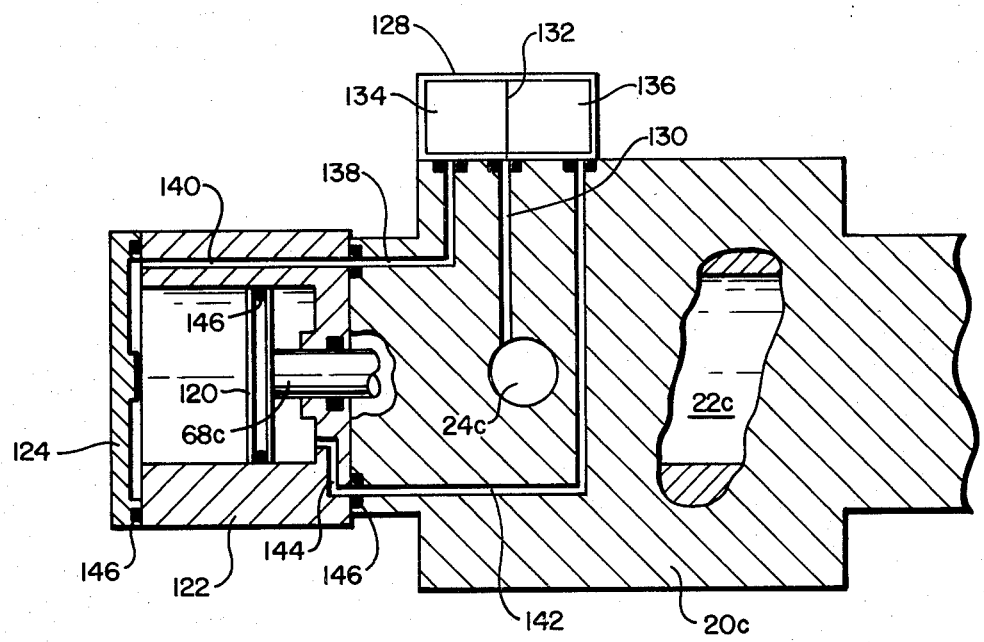
FIG. 10 illustrates the 4-way valve and the various passages which supply pressurized air for shifting the spool.

FIGS. 9 and 10 depict a third embodiment of the foaming device described herein. This embodiment is essentially the same as the one illustrated in FIG. 1 to 8 except that pressurized air is used to shift the spool to the three positions. As shown in FIG. 9, rod 68c is secured at one end to spool 46c and at the other, to position 120 disposed in cylinder 122 which is closed-off by closure 124. Cylinder 122 is secured to housing 20c by bolts 126. Air under pressure is admitted at the downstream end of cylinder 122 to move piston 120 to the left and displace the spool along with it. To shift the spool to the right, pressurized air is admitted at the upstream end of cylinder 122 relative to piston 120.

FIG. 10 illustrates a particular manner of introducing pressurized air into cylinder 122. Air under pressure enters bore 24c and is introduced into valve 128 by means of passage 130. Valve 128 is preferably a 4-way valve which is commercially available. Divider 132 in valve 128 is disposed on the vertical axis of passage 130 and permits air from passage to enter chambers 134, 136 which are provided with push-buttons, not shown. Chamber 134 is in communication with the upstream end of cylinder 122 via passages 138, 140 whereas chamber 136 is in communication with the downstream end of cylinder 122 via passages 142, 144. By depressing a button on chamber 134 or chamber 136, pressurized air from bore 24c can be introduced into one or the other end of cylinder to shift piston 120 and spool 46c one way or the other. Various sealing rings 146 provide the necessary sealing between the abutting elements.

The foaming device described herein has may advantages over similar prior art devices. It is very compact, being about the size of a 10-ounce beer can. It is quite simple in construction and can be easily manueuvered, i.e., it can be attached to a belt or carried in hand. The three hoses which supply foam components are coupled with quick disconnect couplings. There are only two controls: one for adjusting density of the foam by means of the needle valve, and the other for moving the spool to one of the three positions of on, off and clean. Every time the spool is moved from the off to on positions or vice versa, the spool is automatically moved through the air clean position which flushes out with air any remaining residue from internal passages and which also blows out the hose, preparing it for subsequent use without any down time for disassembly. The foaming device can be disassembled and assembled y hand without necessity of any tools. Of the eight main parts, plus screen and O-rings, all of which are readily accessible, only two of the parts are movable. To clean or replace a screen is simple procedure requiring less than two minutes. Normally, only the screen and the O-rings need to be replaced periodically, and these parts are very inexpensive.

With the embodiment of FIGS. 1 to 3, 80 psi air is preferably used together with 1700 to 1900 grams per minute of foaming agent and 2700 to 2900 grams per minute of resin. This presupposes an orifice size in the spray nozzle of 0.032". The various parts of the foaming device shown in FIGS. 1 to 3 are substantially to scale.

Foaming agent is an aqueous solution of about 4 to 5% solids whereas the resin is urea formaldehyde resin of about 42% solids. Air flow is at the rate of about 100 liters per minute at a pressure preferably about 80 psi. Temperature of the liquid solutions should be above 13° C., but below about 30° C. For a more complete description of the resin and the foaming agent, please refer to U.S. Pat. No. 3,979,341.

Having described the invention, it will be obvious to those skilled in the art that modifications can be made without departing from the spirit of the invention. For instance, other components than resin, air and foam agent can be used; the number of components can be varied from two to more than three; various means can be used within the spool to improve mixing of the components; the spool need not be cylindrical in cross-section, as is also true of the housing passage, etc. It is not intended that the language used herein to describe the preferred embodiments be limiting on the scope of the invention, rather it is intended only that the invention be limited by the scope of the claims appended hereto.

What we claim is:

1. Foaming apparatus comprising a housing; means defining an axial cylindrical passage in the housing; a first, second, third and fourth port means in the housing spaced a predetermined distance from each other which provide communication between exterior and interior of the housing; a longitudinal fluid passage means in the wall of the housing bringing into communication the first and third housing port means; a cylindrical spool slidably disposed in the housing; a smaller axial upstream passage means in the spool blocked off at the upstream end; a larger axial downstream passage means in the spool adjoining the upstream spool passage means and forming a shoulder therewith; a first, second and third circumferential spool port means provided on the exterior surface of the spool in a predetermined spaced relationship to each other and to the housing port means; plurality of radial spool channel means connecting each circumferential spool port means with the spool passage means, the first circumferential spool port means being in communication with the upstream spool passage means whereas the second and third circumferential spool port means are in communication with the downstream spool passage means; a tubular spool extension secured to the downstream end of the spool; a tubular element disposed axially within the downstream passage means and secured into the downstream end of the upstream spool passage means providing flow from the upstream spool passage means through the tubular element and being of a smaller diameter than the downstream spool passage means thus creating a mixing chamber therebetween; a spray nozzle secured to the downstream end of the tubular element terminating within the spool extension in spaced relationship thereto to provide space at the downstream end of the spool extension where fluids from the upstream and downstream spool passage means mix; and means for displacing the spool to an operating position whrein the first housing port means is blocked by the spool with the second and third housing port means being in communication with the first and second circumferential spool port means respectively, to an off position wherein all the housing port means are blocked by the spool, and to a clean position wherein second and fourth housing port means are blocked by the spool and first and third housing port means are in communication with first and third circumferential spool port means.

2. Apparatus of claim 1 including a first bore means in the housing in communication with the first housing port for attaching a conduit thereto to supply a fluid, a second bore means in the housing in communication with the third housing port means, and a needle valve disposed in the second housing port means for controlling flow of fluid into the downstream spool passage when the spool is either in on or clean position.

3. Apparatus of claim 2 wherein means for displacing the spool to the three positions includes a rod affixed to the spool, three spaced grooves means provided on the rod corresponding to the three positions of the spool, and a spring-mounted detent disposed in one of the groove means displaceable into other groove means in response to application of manual force.

4. Apparatus of claim 3 including a closure disposed at the upstream end of the housing provided with an axial opening means and a radial bore means, the rod passing through the axial opening means to permit manual grasping thereof outside the housing and the detent being disposed in the radial bore means.

5. Apparatus of claim 4 wherein the spool further includes spaced circumferential o-rings to provide sealing between the housing and spool ports when the spool is in any of the three positions.

6. Apparatus of claim 5 including a screen means disposed in the downstream spool passage means around the tubular element for creating a back pressure in the mixing chamber thereby facilitating foaming action.

* * * * *

UNITED STATES PATENT OFFICE
CERTIFICATE OF CORRECTION

Patent No. 4,219,532              Dated August 26, 1980

Inventor(s) Clifford H. Messervey and Peter R. Martin

It is certified that error appears in the above-identified patent and that said Letters Patent are hereby corrected as shown below:

Column 2; line 46 change "foam" to --form--.

Column 2; line 47 change "form" to --foam--.

Column 4; line 40 change "at" to --by--.

Column 5; line 39 change "may" to --many--.

Column 5; line 55 change "y" to --by--.

Claim 1; line 59 change "whrein" to --wherein--.

Signed and Sealed this

Eleventh Day of November 1980

[SEAL]

Attest:

SIDNEY A. DIAMOND

Attesting Officer      Commissioner of Patents and Trademarks